INVENTORS.
GEORGE B. NEWHOUSE
HOWARD D. SHEKELS
BY
Christie, Parker & Hale
ATTORNEYS INVENTORS.
GEORGE B. NEWHOUSE
HOWARD D. SHEKELS
BY
Christie, Parker & Hale
ATTORNEYS INVENTORS.
GEORGE B. NEWHOUSE
HOWARD D. SHEKELS
BY
Christie, Parker & Hale
ATTORNEYS

United States Patent Office 2,945,212

Patented July 12, 1960

2,945,212

APPARATUS FOR REPRODUCING INTELLIGENCE BY COMPOUND MODULATION

Howard D. Shekels, Dayton, Ohio, and George B. Newhouse, Pasadena, Calif., assignors, by mesne assignments, to Bell & Howell Company, Chicago, Ill., a corporation of Illinois Filed Aug. 2, 1954, Ser. No. 447,352

8 Claims. (Cl. 340—174)

This invention relates to methods and apparatus for reproducing intelligence such as analog data by compound amplitude modulation of signals representing the intelligence to be reproduced.

In order to reproduce analog data, frequently the data is converted to a frequency-modulated signal which is magnetically recorded on tape. The tape can be played back at a later time to reproduce the analog data.

The frequency-modulation system is subject to the disadvantage that small changes in the velocity of the magnetic tape introduce large errors in the reproduced data. Also, drift of the center frequency of the modulator and of the associated D.C. amplifiers introduces a direct error.

These difficulties are overcome in the present invention by employing a compound modulation arrangement for producing signals representing the intelligence to be reproduced and by employing a demodulator responsive to the compound modulation signals for producing an output signal representing the intelligence which is to be reproduced.

In a preferred embodiment of the invention, a suppressed-carrier modulated signal representing the intelligence to be reproduced is provided, and a frequency-modulated version of the suppressed-carrier modulated signal provides a compound modulation signal which is recorded magnetically a version of the carrier signal from which the suppressed-carrier modulated signal was derived is recorded simultaneously with the compound modulation signal. The two magnetically-recorded signals are reproduced, and a suppressed-carrier modulated signal and a signal corresponding to the carrier signal are derived and applied to a detector for suppressed-carrier modulated signals which serves to produce an output signal which represents the original intelligence.

The compound modulation system of the present invention does not require D.C. amplifiers. Instead, A.C. amplifiers are employed and hence there is no problem with respect to drift. Also, drift of the center frequency of the frequency modulator in the compound modulation arrangement produces no error. The compound modulation system has no zero drift due to changes in the speed of the magnetic tape.

Ordinarily flutter on magnetic tape is largely confined to the frequency range between 0 to 300 c.p.s. In a frequency-modulated system for reproducing data, such low frequency flutter produces a direct error because it is within the frequency range in which the apparatus operates. In the compound modulation system of the present invention, the operating band width may be arranged to fall outside the frequency range for flutter so that flutter produces only a second-order effect.

The invention is explained with reference to the drawings, in which.

Figure 1:
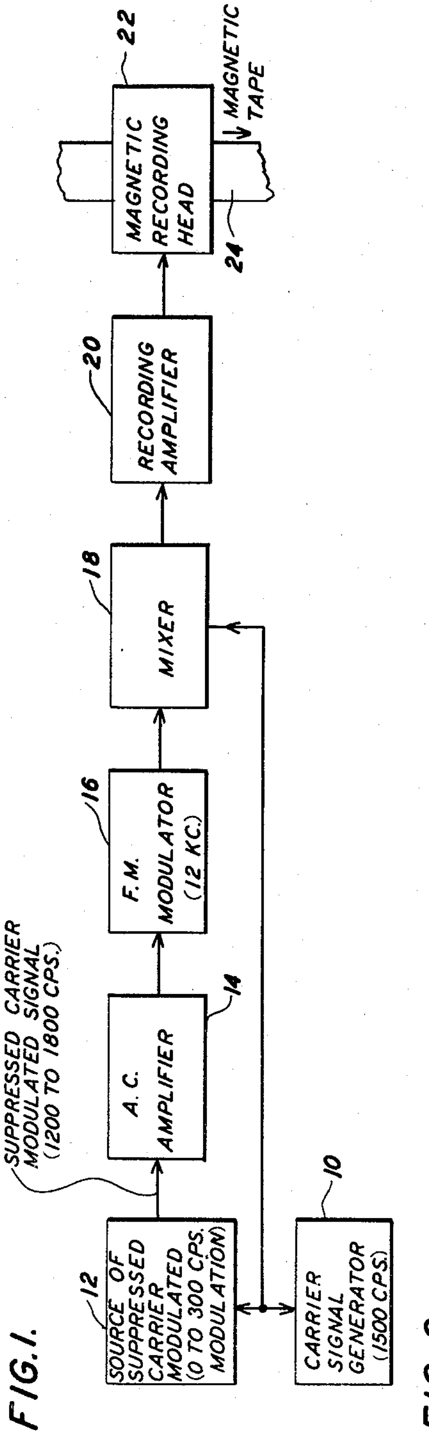
Figs. 1 and 2 show one arrangement for recording and reproducing intelligence.

With reference to Fig. 1, a carrier signal generator 10 produces a carrier signal of substantially constant amplitude, and this signal is applied to a source 12 which produces a suppressed carrier signal which is amplitude modulated in accordance with the intelligence which is to be reproduced.

The suppressed-carrier modulated signal is applied through an A.C. amplifier 14 to a frequency modulator 16 which produces a frequency-modulated version of the suppressed-carrier modulated signal. The output of the frequency modulator and also the carrier signal from the generator 10 are applied to a mixer 18, and the output of the mixer is applied through a recording amplifier 20 to a magnetic recording head 22. A magnetic tape 24 is passed adjacent the recording head at a substantially constant speed, and the compound modulation signal and the carrier signal are magnetically recorded on the tape.

Figure 2:
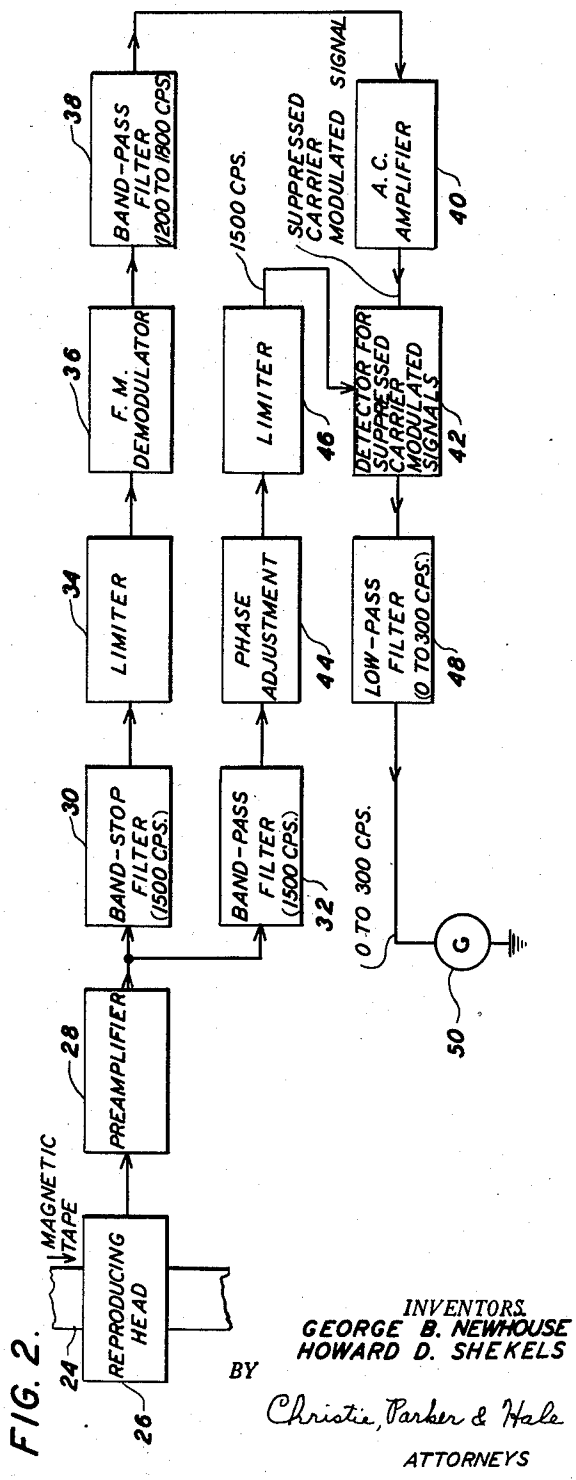

Fig. 2 illustrates an arrangement for playing back magnetic tape which is produced by the apparatus of Fig. 1. The tape is passed adjacent a reproducing head 26 which provides an output signal in accordance with the magnetically recorded signals on the tape.

The output of the reproducing head is applied through a preamplifier 28 to a pair of filters 30 and 32. The filter 30 is of band-stop type which is tuned to the frequency of the carrier signal so that it passes only the compound modulation signal. The signal which is passed by the filter 30 is applied to a limiter 34, and the output of the limiter is applied to a frequency-modulation demodulator 36 which converts the frequency-modulated signal to the suppressed-carrier modulated signal. The output of the demodulator 36 is applied to a band-pass filter 38 which is tuned to pass the frequency band of the suppressed-carrier modulated signal. The output of the filter 38 is applied through an A.C. amplifier 40 to a detector 42 which serves to demodulate the suppressed-carrier modulated signals.

A reference frequency having the same frequency and phase as the carrier signal is applied to the detector 42 so that the suppressed-carrier modulated signal may be demodulated. The band-pass filter 32 passes the carrier signal which is produced at the output of the preamplifier 28 and its output is coupled to a phase adjustment 44 which may be manually adjusted to compensate for any phase shifts which may be introduced by the various components of the recording and reproducing apparatus. The output of the phase adjustment is applied to a limiter 46 which serves to provide a signal of substantially constant amplitude having the same frequency as that of the carrier.

The detector 42 may be any type which serves to demodulate a suppressed-carrier modulated signal in response to a carrier signal and a suppressed-carrier modulated signal applied to its input. By way of example, the detector 42 may be a phase-sensitive A.M. demodulator of the type disclosed in the book "Waveforms" by Chance et al., MIT, vol. 19, p. 511 (14.4) published by McGraw-Hill Book Co., 1949.

The output of the detector 42 represents the original intelligence which was presented in suppressed-carrier modulated form. This output signal is applied through a low-pass filter 48 which is tuned to pass the frequency of the intelligence to be reproduced, and the output of the filter 48 may be applied to any suitable reproducing device such as the galvanometer 50.

The frequencies for a specific arrangement of the recording and reproducing apparatus of Figs. 1 and 2 are illustrated on the drawings. The carrier signal generator produces a signal of 1500 cycles per second which is to be modulated by intelligence which varies between 0 and 300 cycles per second. With such an arrangement the suppressed-carrier modulated signal would have a frequency range of 1200 to 1800 cycles per second. Such a frequency range may be conveniently frequency modulated on a 12-kilocycle center frequency.

Thus, in the apparatus of Fig. 1, a 12 kilocycle frequency-modulated signal and a carrier signal of 1500 cycles per second are recorded magnetically on the tape. These signals are reproduced by the apparatus of Fig. 2 and the frequency-modulated signal is demodulated by the demodulator 36 to provide a suppressed-carrier modulated signal having a frequency range of 1200 to 1800 cycles per second. This signal is passed by the filter 38 and applied through the amplifier 40 to the detector 42.

The carrier signal is passed by the filter 32 and applied through the phase adjustment 44 and the limiter 46 to the detector 42. The detector reproduces the original intelligence, and its output, which may vary between 0 and 300 cycles per second, is applied through the filter 48 to the galvanometer 50.

It will be apparent that the frequencies given to illustrate the operation of the apparatus of Figs. 1 and 2 are merely illustrative and that various other frequencies may be employed, if desired.

Figure 3:
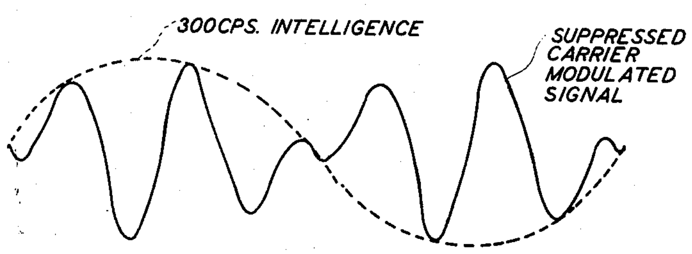
Fig. 3 illustrates the wave form of the suppressed-carrier modulated signal which is produced in the apparatus of Figs. 1 and 2.

Fig. 3 illustrates a suppressed-carrier modulated signal which may be produced when a carrier signal of 1500 cycles per second is modulated by a sinusoidal signal of 300 cycles per second. Such a suppressed-carrier modulated signal may be produced in various ways.

Figure 4:
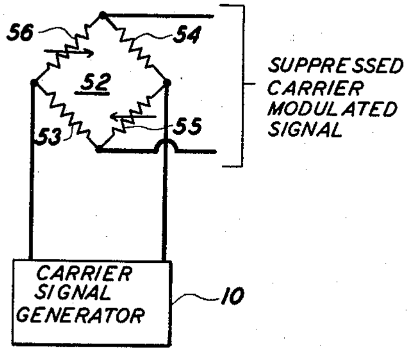
Figs. 4 and 5 show two arrangements for producing suppressed-carrier modulation signals.

Fig. 4 illustrates one way of producing such a signal wherein the carrier signal is applied to the input circuit of a four-arm bridge 52. Two opposed arms 53 and 54 of the bridge provide constant resistance, and the other two opposed arms 55 and 56 provide resistances which vary in opposite directions in response to the intelligence to be recorded. By way of example, the resistance arms 55 and 56 may be two active arms of a pressure-responsive transducer and the other two arms 53 and 54 may be inactive arms of the transducer. The output of such a bridge arrangement provides a suppressed-carrier signal which is modulated in accordance with the variations in resistance of the arms 55 and 56. If required, conventional bridge balancing arrangements may be employed in the apparatus of Fig. 4.

Figure 5:
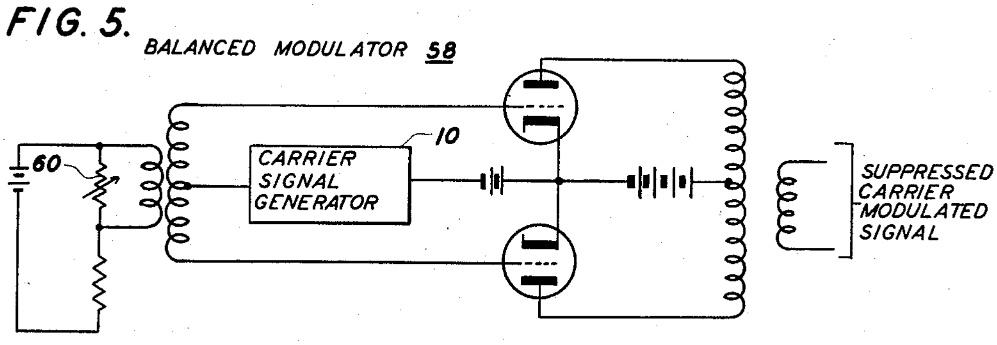

Fig. 5 shows how a suppressed-carrier modulated signal may be produced by a balanced modulator 58. The carrier signal generator 10 is coupled to cause the carrier signal to be applied in the same phase to the two tubes of the balanced modulator so that the carrier signal cancels out in the primary winding of the output transformer of the modulator.

A variable resistor 60 provides a signal to the input of the modulator which varies in accordance with the intelligence to be modulated on the suppressed carrier signal. The variable resistor 60 may be the variable resistance of a strain gauge which is varied in accordance with analog data to be recorded.

The signal which is provided by the variable resistor 60 is applied to the two tubes of the modulator in opposite phase so that the side-band components which are generated by the two tubes will appear at the output of the modulator.

It will be apparent that various other input arrangements may be employed in the balanced modulator. For example, a thermistor-type variable resistance may be employed to provide the input signal.

Figure 6:
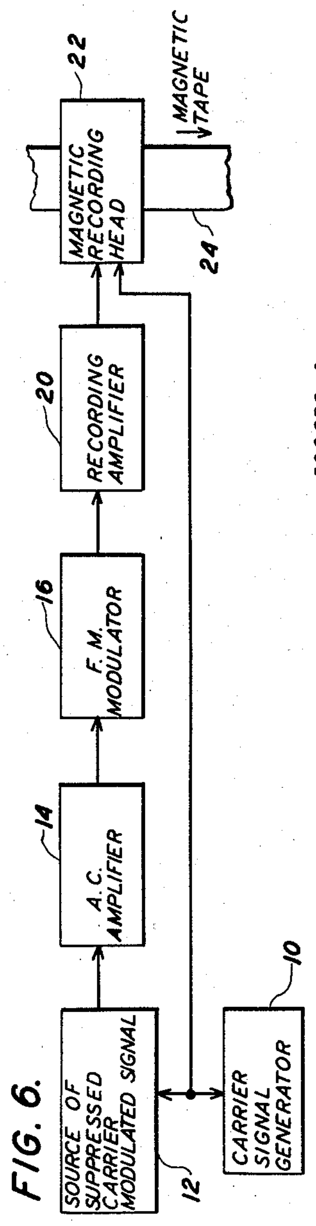
Fig. 6 shows a modification of the recording system of Fig. 1.

Fig. 6 illustrates a modification of the apparatus of Fig. 1 in which the carrier signal which is produced by the generator 10 is applied directly to the magnetic recording head 22, rather than through a mixer and the recording amplifier as illustrated in Fig. 1. If required, the carrier signal may be amplified or attenuated before it is applied to the magnetic recording head.

The apparatus of Fig. 6 functions in the same manner as described above for Fig. 1, with the exception that the compound modulation signal and the carrier signal are mixed in the recording head rather than in an independent mixer.

Figure 7:
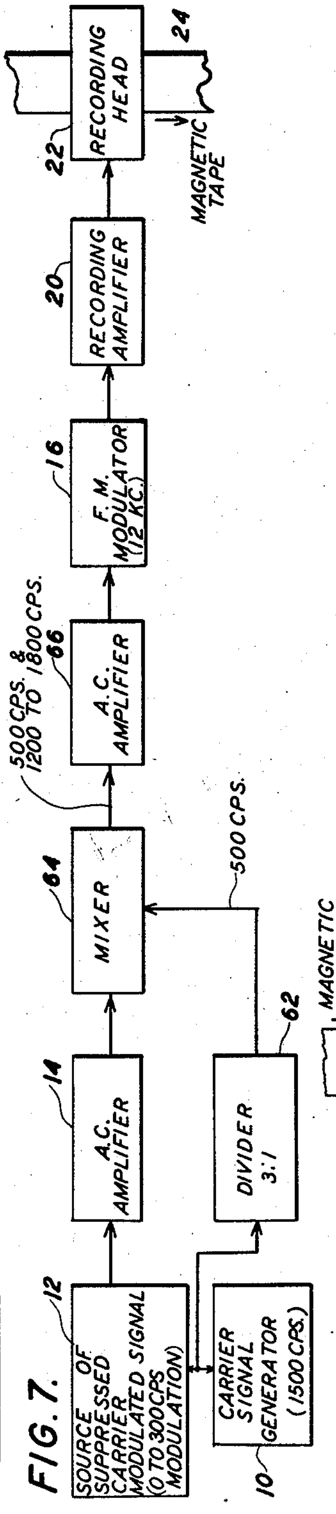
Figs. 7 and 8 show an alternative recording and reproducing system.
Figure 8:
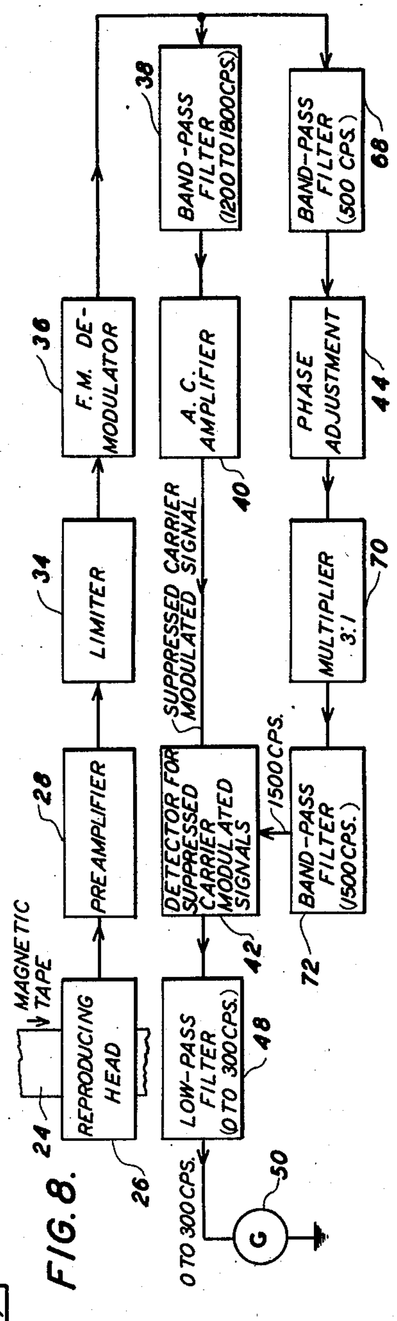

Figs. 7 and 8 show an alternative compound modulation system wherein both the suppressed-carrier modulated signal and a version of the carrier signal are frequency-modulated before being recorded on the magnetic tape.

The signal produced by the carrier generator 10 is applied through a three-to-one divider 62 which provides an output signal having one-third the frequency of the carrier signal. This version of the carrier signal and the suppressed-carrier modulated signal are applied to a mixer 64. The output of the mixer is applied through an A.C. amplifier 66 to the F.M. modulator 16, and the two frequency-modulated signals are applied through the recording amplifier 20 to the recording head 22.

When the magnetic tape is passed adjacent the reproducing head 26, the two signals are reproduced. They are applied through the amplifier 28 and the limiter 34 to the F.M. demodulator 36. This demodulator derives the suppressed-carrier modulated signal, which in turn is applied through the band-pass filter 38 and the A.C. amplifier 40 to the detector 42. The demodulator also derives the divided version of the carrier signal, and it is applied through a band-pass filter 68 which is tuned to pass the divided signal. The output of the filter 68 is applied through a phase adjustment 44 to a multiplier 70 which serves to restore the divided signal to the frequency of the carrier signal. This signal is applied through a band-pass filter 72, which is tuned to the frequency of the carrier signal, to the detector 42. As before, the output of the detector is applied through a low-pass filter 48 which is tuned to the frequency range of the intelligence to be reproduced, and the output of the filter 48 may be coupled to a galvanometer 50.

If the same frequencies are employed in the apparatus of Figs. 7 and 8 as were described with reference to the apparatus of Figs. 1 and 2, the divided signal which is produced by the divider 62 has a frequency of 500 cycles per second. Hence the output of the mixer 64 is then a 500 cycle per second signal and a suppressed-carrier modulated signal which has a frequency range of 1200 to 1800 cycles per second.

In the reproducing apparatus of Fig. 8, the filters 68 and 72 would then be tuned to 500 and 1500 c.p.s., repectively.

A divided version of the carrier signal is recorded on the magnetic tape in the embodiment of Fig. 7 because the carrier itself would interfere with the frequency modulation of the suppressed-carrier modulated signal. It will be apparent that the division ratio need not be necessarily three-to-one. In fact, a reference signal having a frequency higher than that of the carrier may be employed by using a multiplier instead of the divider 62. However, such an arrangement is more complex and it is preferable to employ a subcarrier reference signal.

Various arrangements of apparatus for providing the compound modulation of our invention and for reproducing the original intelligence from the compound-modulated signal have been shown in order to illustrate the many possible variations in the recording and reproducing systems.

It will be apparent that substantially any version of the carrier signal may be recorded along with the compound modulation signal provided the reproducing apparatus is arranged to produce a signal having the frequency of the carrier signal in response to the recorded version of the carrier signal. By "version" as used here and in the claims is meant any signal from which a signal having the desired characteristic can be reproduced, e.g., a modulated signal from which the desired characteristic can be reproduced by demodulation, or a frequency-multiplied signal from which the original frequency can be derived by frequency division.

D.C. amplifiers are eliminated by the use of compound modulation, and hence no drift is introduced by such components. Also, drift of the center frequency of the F.M. modulator has no effect upon the intelligence which is reproduced. The compound modulation system has no zero drift due to tape speed changes. Low frequency flutter has merely a second-order effect because the compound modulation system may be arranged to operate over a frequency range, such as 1200 to 1500 c.p.s., which is outside the frequency range of most flutter on magnetic tape.

We claim:

1. Apparatus for recording and reproducing intelligence comprising means for producing a suppressed-carrier amplitude modulated signal representing the intelligence, means responsive to the suppressed-carrier modulated signal for producing a frequency-modulated version of the suppressed-carrier modulated signal, means for producing a version of the carrier signal from which the suppressed-carrier modulated signal was derived, means for magnetically recording the frequency-modulated signal and the version of the carrier signal, means for reproducing the two magnetically-recorded signals, means for deriving a suppressed-carrier amplitude modulated signal from the reproduced frequency-modulated signal, means for deriving a signal corresponding to the carrier signal from the other reproduced signal, and a detector for suppressed-carrier amplitude modulated signals coupled to receive the derived suppressed-carrier modulated signal and the derived signal which corresponds to the carrier signal for producing an output signal which represents the original intelligence.

2. Apparatus for recording and reproducing intelligence comprising means for producing a suppressed-carrier amplitude modulated signal representing the intelligence, means responsive to the suppressed-carrier modulated signal for producing a frequency-modulated version of the suppressed-carrier modulated signal, means for magnetically recording the frequency-modulated signal and for simultaneously recording the carrier signal from which the suppressed-carrier modulated signal was derived, means for reproducing the two magnetically-recorded signals, means for deriving a suppressed-carrier amplitude modulated signal from the reproduced frequency-modulated signal, means deriving the carrier signal from the other reproduced signal, and a phase-sensitive A.M. detector coupled to receive the derived suppressed-carrier modulated signal and the carrier signal for producing an output signal which represents the original intelligence.

3. The apparatus of claim 2 wherein the means for producing a suppressed-carrier amplitude modulated signal comprises a bridge circuit having four resistance arms with the resistance of two opposed arms varying in opposite directions in response to the intelligence to be recorded, and a carrier signal generator coupled across the input of the bridge circuit.

4. The apparatus of claim 2 wherein the means for producing a suppressed-carrier amplitude modulated signal comprises a balanced amplitude modulator, a carrier signal generator coupled to cause the carrier signal to be applied in the same phase to each side of the balanced modulator so that the carrier signal cancels out in the output of the balanced modulator, and a transducer coupled to the input of the balanced modulator for providing a signal which varies in accordance with the intelligence to be recorded.

5. Apparatus for recording intelligence comprising a carrier signal generator, means coupled to the generator for producing a suppressed-carrier signal amplitude modulated in accordance with the intelligence to be recorded, means responsive to the suppressed-carrier modulated signal for producing a frequency modulated version of the suppressed-carrier modulated signal, means for magnetically recording the frequency-modulated signal, and means coupled to the carrier signal generator for simultaneously recording a reference version of the carrier signal.

6. Apparatus for reproducing a signal corresponding to intelligence in electrical form comprising means for producing a suppressed-carrier signal which is amplitude modulated in accordance with the intelligence to be reproduced, means for frequency-modulating a carrier signal of substantially different frequency from the suppressed-carrier signal in response to said suppressed-carrier signal, means for generating a reference signal indicative of the frequency of the carrier from which the suppressed-carrier signal is derived, means for simultaneously recording the reference signal together with the frequency-modulated signal, means for reproducing the reference signal and the frequency-modulated signal from the recording, means including a frequency-modulation detector for deriving the suppressed-carrier signal from the output of the reproducing means, means for deriving from the reproduced reference signal a carrier signal corresponding in frequency to the carrier signal from which the suppressed-carrier signal is derived, and a balanced detector responsive to the derived suppressed-carrier signal and derived carrier signal for reproducing a signal corresponding to the original intelligence.

7. Apparatus as defined in claim 6 wherein the recorded reference signal has the same frequency as the carrier from which the suppressed-carrier signal is derived.

8. Apparatus as defined in claim 6 wherein the means for generating the reference signal includes means for producing a signal having a frequency that is a fixed predetermined ratio of the frequency of the carrier from which the suppressed-carrier signal is derived and means for frequency-modulating a carrier signal of substantially higher frequency in response to said last-named signal having a fixed frequency ratio to the carrier from which the suppressed-carrier signal is derived.

References Cited in the file of this patent

UNITED STATES PATENTS

| | | |
|---|---|---|
| 2,436,834 | Stodola | Mar. 2, 1948 |
| 2,457,137 | Earp et al. | Dec. 28, 1948 |
| 2,514,425 | Thompson | July 11, 1950 |
| 2,578,714 | Martin | Dec. 18, 1951 |
| 2,604,533 | Koros | July 22, 1952 |
| 2,629,776 | Terry | Feb. 24, 1953 |
| 2,668,283 | Mullin | Feb. 2, 1954 |
| 2,685,079 | Hoeppner | July 27, 1954 |

OTHER REFERENCES

Radio Engineering, Terman, third ed., 1947, McGraw-Hill Book Company, pages 480–481.